United States Patent
Scott et al.

(10) Patent No.: US 10,006,306 B2
(45) Date of Patent: Jun. 26, 2018

(54) TURBINE EXHAUST CASE ARCHITECTURE

(71) Applicant: United Technologies Corporation, Hartford, CT (US)

(72) Inventors: Jonathan Ariel Scott, Southington, CT (US); Albert Veninger, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 351 days.

(21) Appl. No.: 14/758,367

(22) PCT Filed: Dec. 19, 2013

(86) PCT No.: PCT/US2013/076482
§ 371 (c)(1),
(2) Date: Jun. 29, 2015

(87) PCT Pub. No.: WO2014/105616
PCT Pub. Date: Jul. 3, 2014

(65) Prior Publication Data
US 2015/0330250 A1    Nov. 19, 2015

Related U.S. Application Data

(60) Provisional application No. 61/747,262, filed on Dec. 29, 2012.

(51) Int. Cl.
*F01D 25/14* (2006.01)
*F01D 9/04* (2006.01)
(Continued)

(52) U.S. Cl.
CPC ............. *F01D 25/145* (2013.01); *F01D 9/02* (2013.01); *F01D 9/041* (2013.01); *F01D 9/065* (2013.01);
(Continued)

(58) Field of Classification Search
CPC .......... F01D 25/145; F01D 9/02; F01D 9/065; F01D 25/28; Y02T 50/673
(Continued)

(56) References Cited

U.S. PATENT DOCUMENTS

| 2,214,108 A | 7/1938 | Grece |
| 3,576,328 A | 4/1971 | Vose |

(Continued)

FOREIGN PATENT DOCUMENTS

| EP | 2261468 A1 | 12/2010 |
| EP | 2497907 A2 | 9/2012 |

(Continued)

OTHER PUBLICATIONS

European Patent Office, extended European search report, dated Dec. 10, 2015, 8 pages.

(Continued)

*Primary Examiner* — Ninh H Nguyen
*Assistant Examiner* — Topaz L Elliott
(74) *Attorney, Agent, or Firm* — Kinney & Lange, P.A.

(57) ABSTRACT

A turbine exhaust case (28) for a gas turbine engine (10) comprises a frame (100), a vane fairing (108), a heat shield (124, 126, 128), and a serpentine cooling path. The frame has an outer ring (102) and an inner ring (104) connected by a hollow strut (106) with a radial service line passage (132). The vane fairing is disposed between the inner ring and the outer ring to define a core airflow path. The heat shield is disposed between the vane fairing and the frame. The serpentine cooling flow path passes through and around the outer ring, the inner ring, and the plurality of struts.

15 Claims, 3 Drawing Sheets

(51) Int. Cl.

| | | |
|---|---|---|
| *F01D 25/16* | (2006.01) | |
| *F01D 25/00* | (2006.01) | |
| *F01D 9/02* | (2006.01) | |
| *F01D 25/12* | (2006.01) | |
| *F01D 9/06* | (2006.01) | |
| *F01D 25/30* | (2006.01) | |
| *F01D 25/24* | (2006.01) | |

(52) U.S. Cl.
CPC ........... *F01D 25/005* (2013.01); *F01D 25/12* (2013.01); *F01D 25/125* (2013.01); *F01D 25/162* (2013.01); *F01D 25/24* (2013.01); *F01D 25/30* (2013.01); *F05D 2220/32* (2013.01); *F05D 2240/15* (2013.01); *F05D 2250/185* (2013.01); *F05D 2260/202* (2013.01); *F05D 2260/231* (2013.01); *Y02T 50/673* (2013.01); *Y02T 50/675* (2013.01)

(58) Field of Classification Search
USPC ......................................................... 415/177
See application file for complete search history.

(56) References Cited

U.S. PATENT DOCUMENTS

| | | |
|---|---|---|
| 3,802,046 A | 4/1974 | Wachtell et al. |
| 3,970,319 A | 7/1976 | Carroll et al. |
| 4,009,569 A | 3/1977 | Kozlin |
| 4,044,555 A | 4/1977 | McLoughlin et al. |
| 4,088,422 A | 5/1978 | Martin |
| 4,114,248 A | 9/1978 | Smith et al. |
| 4,305,697 A | 12/1981 | Cohen et al. |
| 4,321,007 A | 3/1982 | Dennison et al. |
| 4,369,016 A | 1/1983 | Dennison |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,793,770 A | 12/1988 | Schonewald et al. |
| 4,920,742 A | 5/1990 | Nash et al. |
| 4,979,872 A * | 12/1990 | Myers .................... F01D 9/065 403/131 |
| 4,987,736 A | 1/1991 | Ciokajlo et al. |
| 4,989,406 A | 2/1991 | Vdoviak et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,076,049 A | 12/1991 | VonBenken et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,541 A | 5/1993 | Fledderjohn et al. |
| 5,236,302 A | 8/1993 | Weisgerber et al. |
| 5,246,295 A | 9/1993 | Ide |
| 5,265,807 A | 11/1993 | Steckbeck et al. |
| 5,269,057 A | 12/1993 | Mendham |
| 5,272,869 A | 12/1993 | Dawson et al. |
| 5,273,397 A | 12/1993 | Czachor et al. |
| 5,292,227 A | 3/1994 | Czachor et al. |
| 5,312,227 A | 5/1994 | Grateau et al. |
| 5,338,154 A | 8/1994 | Meade et al. |
| 5,357,744 A | 10/1994 | Czachor et al. |
| 5,370,402 A | 12/1994 | Gardner et al. |
| 5,385,409 A | 1/1995 | Ide |
| 5,401,036 A | 3/1995 | Basu |
| 5,438,756 A | 8/1995 | Halchak et al. |
| 5,474,305 A | 12/1995 | Flower |
| 5,483,792 A | 1/1996 | Czachor et al. |
| 5,558,341 A | 9/1996 | McNickle et al. |
| 5,597,286 A | 1/1997 | Dawson et al. |
| 5,605,438 A | 2/1997 | Burdgick et al. |
| 5,609,467 A | 3/1997 | Lenhart et al. |
| 5,632,493 A | 5/1997 | Gardner |
| 5,634,767 A | 6/1997 | Dawson |
| 5,691,279 A | 11/1997 | Tauber et al. |
| 5,755,445 A | 5/1998 | Arora |
| 5,851,105 A | 12/1998 | Fric et al. |
| 5,911,400 A | 6/1999 | Niethammer et al. |
| 6,163,959 A | 12/2000 | Arraitz et al. |
| 6,196,550 B1 | 3/2001 | Arora et al. |
| 6,227,800 B1 | 5/2001 | Spring et al. |
| 6,337,751 B1 | 1/2002 | Kimizuka |
| 6,343,912 B1 | 2/2002 | Mangeiga et al. |
| 6,358,001 B1 | 3/2002 | Bosel et al. |
| 6,364,316 B1 | 4/2002 | Arora |
| 6,439,841 B1 | 8/2002 | Bosel |
| 6,511,284 B2 | 1/2003 | Darnell et al. |
| 6,578,363 B2 | 6/2003 | Hashimoto et al. |
| 6,601,853 B2 | 8/2003 | Inoue |
| 6,612,807 B2 | 9/2003 | Czachor |
| 6,619,030 B1 | 9/2003 | Seda et al. |
| 6,638,013 B2 | 10/2003 | Nguyen et al. |
| 6,652,229 B2 | 11/2003 | Lu |
| 6,672,833 B2 | 1/2004 | MacLean et al. |
| 6,719,524 B2 | 4/2004 | Nguyen et al. |
| 6,736,401 B2 | 5/2004 | Chung et al. |
| 6,792,758 B2 | 9/2004 | Dowman |
| 6,796,765 B2 | 9/2004 | Kosel et al. |
| 6,805,356 B2 | 10/2004 | Inoue |
| 6,811,154 B2 | 11/2004 | Proctor et al. |
| 6,935,631 B2 | 8/2005 | Inoue |
| 6,969,826 B2 | 11/2005 | Trewiler et al. |
| 6,983,608 B2 | 1/2006 | Allen, Jr. et al. |
| 7,055,305 B2 * | 6/2006 | Baxter .................. F01D 25/145 415/115 |
| 7,094,026 B2 | 8/2006 | Coign et al. |
| 7,100,358 B2 | 9/2006 | Gekht et al. |
| 7,200,933 B2 | 4/2007 | Lundgren et al. |
| 7,229,249 B2 | 6/2007 | Durocher et al. |
| 7,238,008 B2 | 7/2007 | Bobo et al. |
| 7,367,567 B2 | 5/2008 | Farah et al. |
| 7,371,044 B2 | 5/2008 | Nereim |
| 7,389,583 B2 | 6/2008 | Lundgren |
| 7,614,150 B2 | 11/2009 | Lundgren |
| 7,631,879 B2 | 12/2009 | Diantonio |
| 7,673,461 B2 | 3/2010 | Cameriano et al. |
| 7,677,047 B2 | 3/2010 | Somanath et al. |
| 7,735,833 B2 | 6/2010 | Braun et al. |
| 7,797,922 B2 * | 9/2010 | Eleftheriou ........... F01D 25/162 415/208.4 |
| 7,798,768 B2 | 9/2010 | Strain et al. |
| 7,815,417 B2 | 10/2010 | Somanath et al. |
| 7,824,152 B2 | 11/2010 | Morrison |
| 7,891,165 B2 | 2/2011 | Bader et al. |
| 7,909,573 B2 | 3/2011 | Cameriano et al. |
| 7,955,446 B2 | 6/2011 | Dierberger |
| 7,959,409 B2 | 6/2011 | Guo et al. |
| 7,988,799 B2 | 8/2011 | Dierberger |
| 8,069,648 B2 | 12/2011 | Snyder et al. |
| 8,083,465 B2 * | 12/2011 | Herbst .................. B23P 6/005 29/402.11 |
| 8,083,471 B2 * | 12/2011 | Black ..................... F01D 25/28 415/134 |
| 8,091,371 B2 | 1/2012 | Durocher et al. |
| 8,092,161 B2 | 1/2012 | Cai et al. |
| 8,152,451 B2 | 4/2012 | Manteiga et al. |
| 8,162,593 B2 | 4/2012 | Guimbard et al. |
| 8,172,526 B2 | 5/2012 | Lescure et al. |
| 8,177,488 B2 | 5/2012 | Manteiga et al. |
| 8,221,071 B2 | 7/2012 | Wojno et al. |
| 8,245,399 B2 | 8/2012 | Anantharaman et al. |
| 8,245,518 B2 | 8/2012 | Durocher et al. |
| 8,282,342 B2 | 10/2012 | Tonks et al. |
| 8,371,127 B2 | 2/2013 | Durocher et al. |
| 8,371,812 B2 | 2/2013 | Manteiga et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |

(56) References Cited

U.S. PATENT DOCUMENTS

| | | |
|---|---|---|
| 2003/0161716 A1 | 8/2003 | Nguyen et al. |
| 2005/0046113 A1 | 3/2005 | Inoue |
| 2005/0229602 A1 | 10/2005 | Whiting |
| 2006/0010852 A1 | 1/2006 | Gekht et al. |
| 2008/0216300 A1 | 9/2008 | Anderson et al. |
| 2009/0200275 A1* | 8/2009 | Twelves, Jr. ....... B23K 20/1215 219/76.1 |
| 2010/0061846 A1 | 3/2010 | Herbst et al. |
| 2010/0132371 A1 | 6/2010 | Durocher et al. |
| 2010/0132374 A1 | 6/2010 | Manteiga et al. |
| 2010/0132376 A1 | 6/2010 | Durocher et al. |
| 2010/0132377 A1 | 6/2010 | Durocher et al. |
| 2010/0202872 A1 | 8/2010 | Weidmann |
| 2010/0236244 A1 | 9/2010 | Longardner |
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0061767 A1 | 3/2011 | Vontell et al. |
| 2011/0079019 A1 | 4/2011 | Durocher et al. |
| 2011/0081237 A1 | 4/2011 | Durocher et al. |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2012/0321451 A1 | 12/2012 | Xiao et al. |
| 2013/0011242 A1 | 1/2013 | Beeck et al. |

FOREIGN PATENT DOCUMENTS

| | | |
|---|---|---|
| WO | WO 03/020469 A1 | 3/2003 |
| WO | WO 2006/007686 A1 | 1/2006 |
| WO | WO 2009/157817 A1 | 12/2009 |
| WO | WO 2010/002295 A1 | 1/2010 |
| WO | WO 2012/158070 A1 | 11/2012 |

OTHER PUBLICATIONS

International Search Report and Written Opinion from PCT Application No. PCT/US2013/076482, dated Apr. 8, 2014, 11 pages.

* cited by examiner

TURBINE EXHAUST CASE ARCHITECTURE

BACKGROUND

The present disclosure relates generally to gas turbine engines, and more particularly to heat management in a turbine exhaust case of a gas turbine engine.

A turbine exhaust case is a structural frame that supports engine bearing loads while providing a gas path at or near the aft end of a gas turbine engine. Some aeroengines utilize a turbine exhaust case to help mount the gas turbine engine to an aircraft airframe. In industrial applications, a turbine exhaust case is more commonly used to couple gas turbine engines to a power turbine that powers an electrical generator. Industrial turbine exhaust cases can, for instance, be situated between a low pressure engine turbine and a generator power turbine. A turbine exhaust case must bear shaft loads from interior bearings, and must be capable of sustained operation at high temperatures.

Turbine exhaust cases serve two primary purposes: airflow channeling and structural support. Turbine exhaust cases typically comprise structures with inner and outer rings connected by radial struts. The struts and rings often define a core flow path from fore to aft, while simultaneously mechanically supporting shaft bearings situated axially inward of the inner ring. The components of a turbine exhaust case are exposed to very high temperatures along the core flow path. Various approaches and architectures have been employed to handle these high temperatures. Some turbine exhaust case frames utilize high-temperature, high-stress capable materials to both define the core flow path and bear mechanical loads. Other frame architectures separate these two functions, pairing a structural frame for mechanical loads with a high-temperature capable fairing to define the core flow path.

SUMMARY

The present disclosure is directed toward a turbine exhaust case for a gas turbine engine. The turbine exhaust case comprises a frame, a vane fairing, a heat shield, and a serpentine cooling path. The frame has an outer ring and an inner ring connected by a hollow strut with a radial service line passage. The vane fairing is disposed between the inner ring and the outer ring to define a core airflow path. The heat shield is disposed between the vane fairing and the frame. The serpentine cooling flow path passes through and around the outer ring, the inner ring, and the plurality of struts

DETAILED DESCRIPTION

Figure 1:
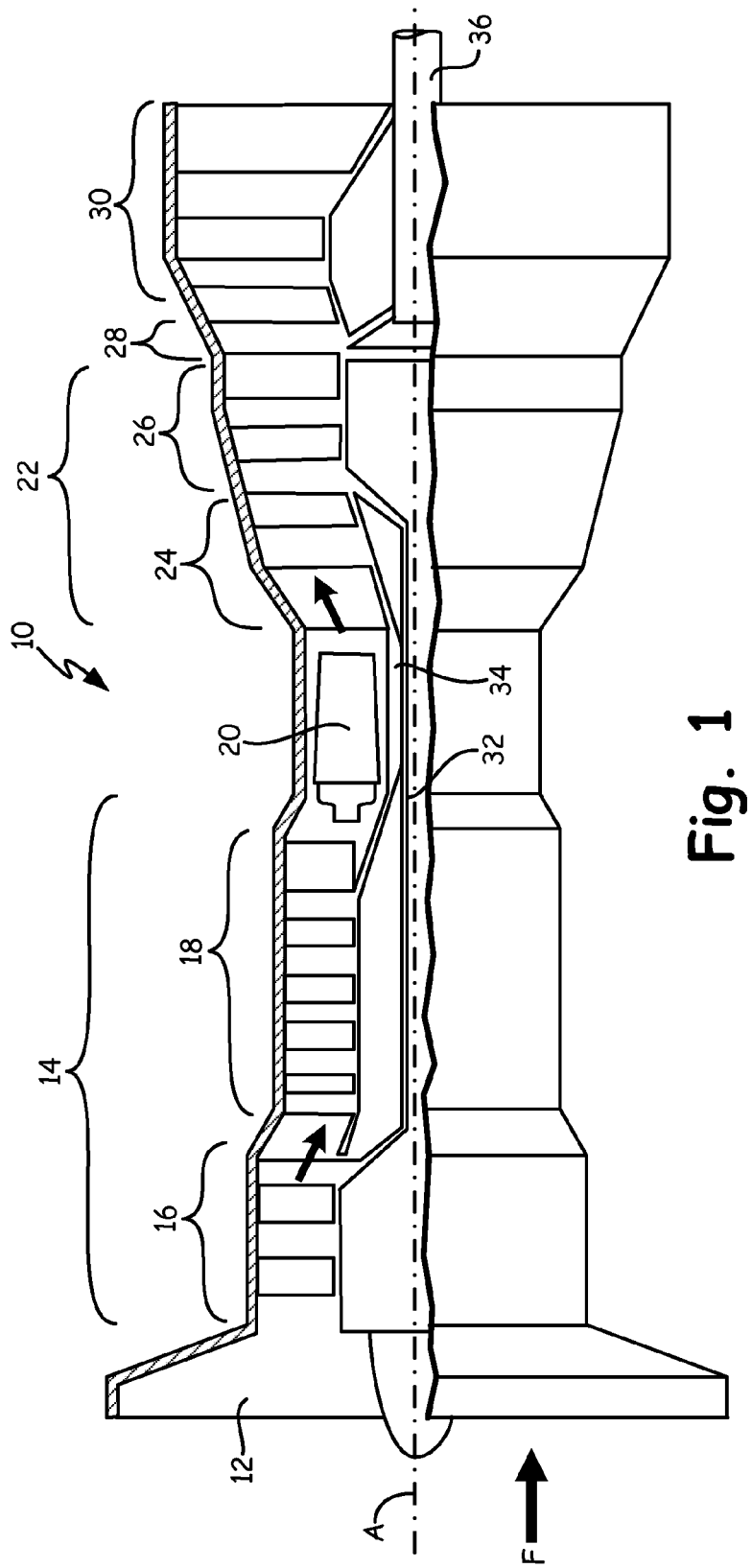
FIG. 1 is a simplified partial cross-sectional view of an exemplary gas turbine engine.

FIG. 1 is a simplified partial cross-sectional view of gas turbine engine 10, comprising inlet 12, compressor 14 (with low pressure compressor 16 and high pressure compressor 18), combustor 20, engine turbine 22 (with high pressure turbine 24 and low pressure turbine 26), turbine exhaust case 28, power turbine 30, low pressure shaft 32, high pressure shaft 34, and power shaft 36. Gas turbine engine 10 can, for instance, be an industrial power turbine.

Low pressure shaft 32, high pressure shaft 34, and power shaft 36 are situated along rotational axis A. In the depicted embodiment, low pressure shaft 32 and high pressure shaft 34 are arranged concentrically, while power shaft 36 is disposed axially aft of low pressure shaft 32 and high pressure shaft 34. Low pressure shaft 32 defines a low pressure spool including low pressure compressor 16 and low pressure turbine 26. High pressure shaft 34 analogously defines a high pressure spool including high pressure compressor 18 and high pressure turbine 24. As is well known in the art of gas turbines, airflow F is received at inlet 12, then pressurized by low pressure compressor 16 and high pressure compressor 18. Fuel is injected at combustor 20, where the resulting fuel-air mixture is ignited. Expanding combustion gasses rotate high pressure turbine 24 and low pressure turbine 26, thereby driving high and low pressure compressors 18 and 16 through high pressure shaft 34 and low pressure shaft 32, respectively. Although compressor 14 and engine turbine 22 are depicted as two-spool components with high and low sections on separate shafts, single spool or three or more spool embodiments of compressor 14 and engine turbine 22 are also possible. Turbine exhaust case 28 carries airflow from low pressure turbine 26 to power turbine 30, where this airflow drives power shaft 36. Power shaft 36 can, for instance, drive an electrical generator, pump, mechanical gearbox, or other accessory (not shown).

In addition to defining an airflow path from low pressure turbine 26 to power turbine 30, turbine exhaust case 28 can support one or more shaft loads. Turbine exhaust case 28 can, for instance, support low pressure shaft 32 via bearing compartments (not shown) disposed to communicate load from low pressure shaft 32 to a structural frame of turbine exhaust case 28.

Figure 2:
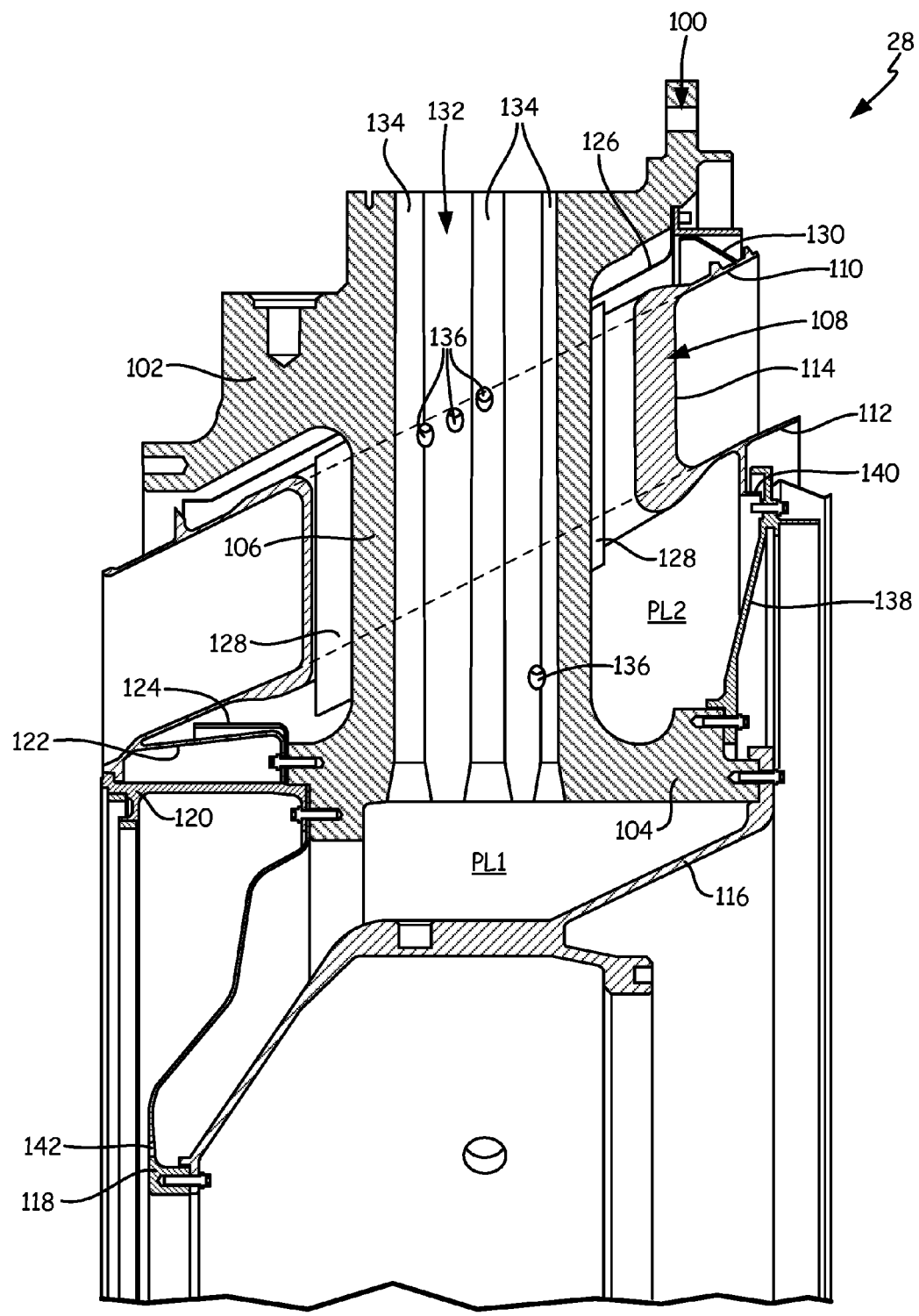
FIG. 2 is a cross-sectional view of a turbine exhaust case of the gas turbine engine of FIG. 1.

FIG. 2 is a cross-sectional view of turbine exhaust case 28, illustrating frame 100 (with outer ring 102, inner ring 104, and strut 106), fairing 108 (with outer platform 110, inner platform 112, and fairing vane 114, and retention structure 122), bearing support 116, flow divider 118, forward seal support 120, inner heat shield 124, outer heat shield 126, strut heat shield 128, aft air seal 130, strut passage 132 (with service line channels 134), strut holes 136, aft plate 138, aft airflow exit 140, and pressurized airflow inlet 142.

As described above with respect to FIG. 1, turbine exhaust case 28 defines an airflow path for core flow F, and carries radial load from bearing support 116 (which in turn connects to bearing compartments, not shown). These two functions are performed by separate components: frame 100 carries radial bearing loads, while fairing 108 defines the flow path of core flow F.

Frame 100 is a thick, rigid support structure formed, for example, of sand-cast steel. Outer ring 102 of frame 100 serves as an attachment point for low pressure turbine 26, power turbine 30, mounting hardware, and service lines including both cooling and lubrication lines. Frame inner ring 104 is bolted to bearing support 116 via bolts, and communicates radial load from bearing support 116 to outer ring 102 via frame struts 106, which extend at angular intervals between inner ring 104 and frame outer ring 102. Strut 106 is hollow, containing strut passage 132. Strut passage 132 is a radial passage through strut 106 configured to carry service lines such as air supply lines and lines for scavenging or supplying lubricating oil to axial bearings as well as cooling air flow. In the depicted embodiment, strut passage 132 is contoured to provide a three service line channels 134 sized for particular service lines. In alternative embodiments, strut passage 132 can contain any number of service line channels 134, or can be substantially uncontoured. Strut passage 132 can capped or covered to prevent any airflow from entering or exiting turbine exhaust case 28 through strut passage 132, save through service lines disposed along service line channels 134. Strut holes 136 are flow openings extending from strut passage 132 through the body of strut 106 to allow airflow from strut passage 132 to the exterior of strut 106. Strut holes 136 direct airflow from strut passage 132 towards the inner diameter of outer ring 102, as described below with respect to FIG. 3. Although only one strut 106 is illustrated in FIG. 2, turbine exhaust case 28 can have any number of struts 106 distributed at angular intervals about axis A (see FIG. 1).

Fairing 108 is a high-temperature capable aerodynamic structure defining the boundaries of core flow F through turbine exhaust case 28. Fairing outer platform 110 defines an outer flowpath diameter, while fairing inner platform 112 defines an inner flowpath diameter. Fairing vanes 114 surround frame struts 106, and form aerodynamic vane bodies. Fairing 108 is rated for higher temperatures than frame 100, and is affixed to frame 100 via retention structure. In the depict embodiment, retention structure 122 is an L-shaped flange situated at the forward inner diameter of fairing 108 and bolted to inner ring 104 of frame 100, and serves as the only point of contact securing fairing 108 to frame 100. Retention structure 122 can alternative be secured to frame 100 by other means, such as by rivets, pins, or screws. In other embodiments, retention structure can be situated at different locations, including at the forward outer diameter of fairing 108, secured to outer ring 102.

Bearing support 116 is a structural frame carrying bearing load radially outward from shaft bearings (not shown) to inner ring 104. Flow divider 118 is a thin separator providing an air seal between turbine exhaust case 28 and upstream components such as low pressure turbine 26. Aft plate 138 is an annular dish disposed at the aft of inner ring 104 to provide a partial air seal with fairing inner platform 112. Frame 100, bearing support 116, and flow divider 118 cooperate to define first plenum $PL_1$, an air cavity for cooling airflow. Frame inner wall 104, aft plate 138, and fairing 108 cooperate to define second plenum $PL_2$, a second air cavity for cooling airflow. First plenum $PL_1$ and second plenum $PL_2$ discussed in greater detail below with respect to FIG. 3. Aft air seal 130 is depicted as a spring seal, although other forms of air seal can analogously be used. Aft air seal 130 minimizes air escape from second plenum $PL_2$. Retention structure 122 also acts as an air seal preventing air from escaping second plenum $PL_2$ upstream towards low pressure turbine 26. Exit 140 can, similarly confines airflow rate from inner plenum $PL_2$ to power turbine 30 to desired rates, thereby maintaining desired cooling airflow pressure within turbine exhaust case 28. Exit 140 can, for instance, be an opening or a labyrinth seal. In some cases flow divider 118 or bearing support 116 can include one or more air pressurized air inlets 142 by which pressurized air can be received into first plenum $PL_1$ from compressor 14, as described below with respect to FIG. 3.

Turbine exhaust case 28 includes a plurality of heat shields to protect frame 100 from radiative heating. Strut heat shield 128 is situated between fairing vanes 114 and frame struts 106. Outer heat shield 126 is situated between fairing outer platform 110 and frame outer ring 102. Inner heat shield 124 is situated between retention structure 120 and fairing inner platform 112. Like fairing 108, all three heat shields can be formed of Inconel or a similar nickel-based superalloy. Strut heat shield 128, outer heat shield 126, and inner heat shield 124 act as barriers to radiative heat from fairing 118, which can become very hot during operation of gas turbine 10. Heat shields 124, 126, and 128 thus protect frame 100, which is rated to lower temperatures than fairing 118, from exposure to excessive heat.

Fairing 108 and heat shields 124, 126, and 128 are thin structures relative to frame 100, and can for instance be stamped, investment cast, or die-cast from a superalloy material such as Inconel 625, Inconel 718, a combination thereof, or other nickel-based superalloys. In one embodiment, fairing 108 is investment cast, while heat shields 124, 126, and 128 are stamped or spin formed sheet metal. In some embodiments, fairing 108 and/or heat shields 124, 126 and/or 128 can have thermal coatings for increased operating temperature capacity. Frame 100, by contrast, can be formed by a relatively rough or inexpensive casting method, e.g. by sand casting. Frame 100 is formed of steel, and is accordingly rated to lower temperatures than fairing 108 or heat shields 124, 126, or 128. By utilizing cast steel frame 100 for structural support, the overall expense and machining complexity of turbine exhaust case 28 is reduced. To protect frame 100 from overheating, heat shields 124, 126, and 128 are disposed between fairing 108 and frame 100 to impede radiative heating from fairing 108. In addition, cooling air is circulated through plena $PL_1$ and $PL_2$ in a triple-pass cooling path (described below with respect to FIG. 3) to further cool frame 100.

Figure 3:
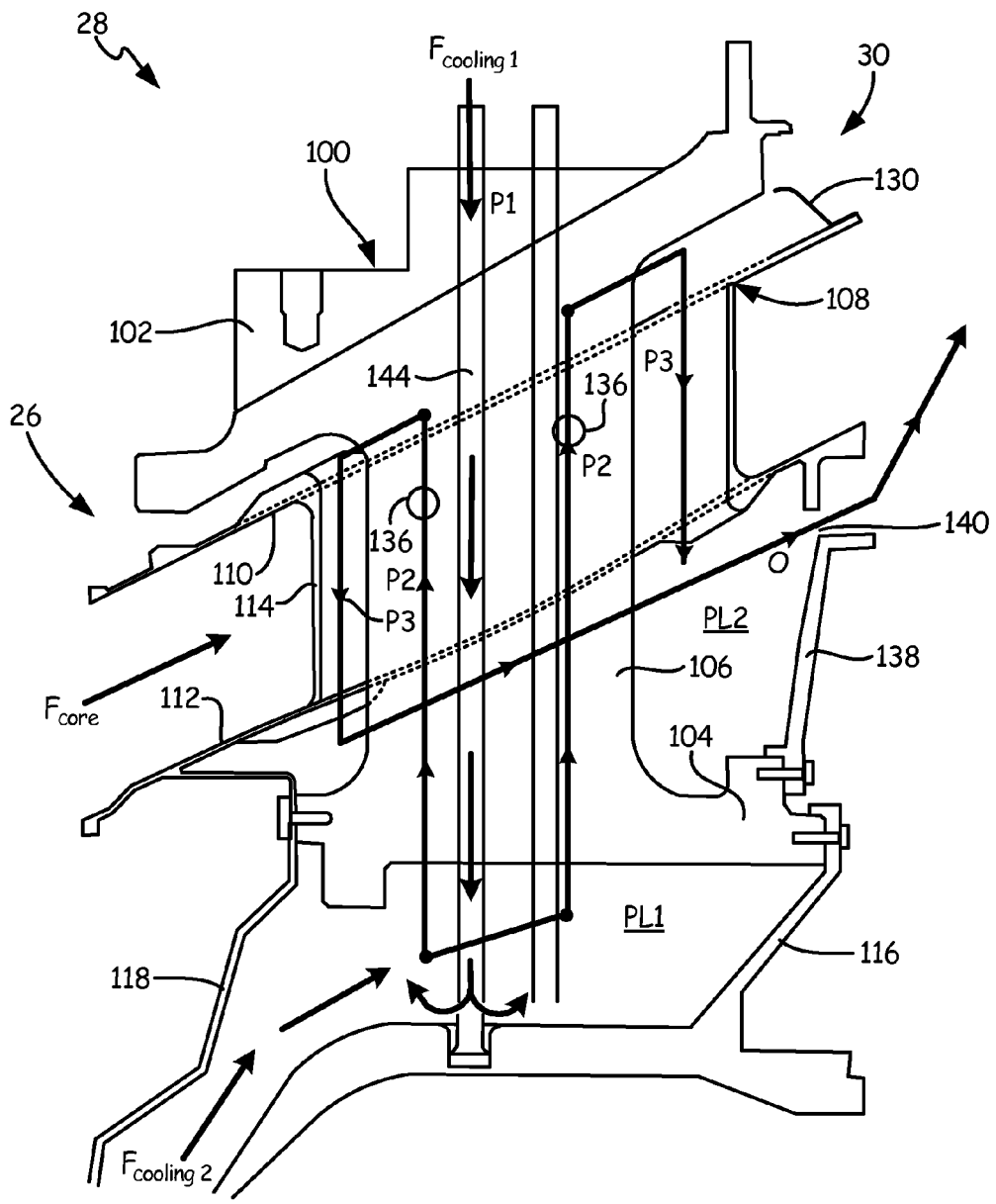
FIG. 3 is a simplified cross-sectional view of the turbine exhaust case of FIG. 2, illustrating cooling flow paths.

FIG. 3 is a simplified cross-sectional illustration of a triple-pass serpentine cooling path through turbine exhaust case 28 for cooling frame 100 and surrounding components. FIG. 3 depicts frame 100 (with outer ring 102, inner ring 104, and struts 106 with strut holes 136), fairing 108 (with outer platform 110, inner platform 112, and fairing vane 114), bearing support 116, flow divider 118, air seal 130, aft plate 138, and exit 140, as described above with respect to FIG. 2. FIG. 3 further identifies service line 144 and paths segments $P_1$, $P_2$, $P3_3$, and O of the triple-pass cooling serpentine cooling path.

Path segment $P_1$ carries primary cooling airflow $F_{cooling1}$ radially inward along service line 144, an air inlet disposed within strut passage 132 (see FIG. 2). Cooling airflow $F_{cooling1}$ can, in some embodiments, be actively cooled, e.g. via heat exchanger before entering path segment $P_1$. Path segment $P_1$ is entirely enclosed within service line 144, and terminates in first plenum $PL_1$. In some embodiments, primary cooling airflow $F_{cooling1}$ can be supplemented by secondary cooling airflow $F_{cooling2}$ bled from compressor 14 and diverted along low pressure shaft 32. Secondary cooling airflow $F_{cooling2}$ can be hotter but higher pressure than primary cooling airflow $F_{cooling1}$, and increases the overall pressure of cooling airflow through path segments P2, P3, and O.

Primary and secondary cooling airflows $F_{cooling1}$ and $F_{cooling2}$ mix and circulate within plenum $PL_1$, cooling the inner diameter of inner ring 104 of frame 100. From plenum $PL_1$, this mixed secondary airflow travels up strut 106 through service line passage 134 (but not within service line 144), and out through strut holes 136 along path segment $P_2$, cooling strut 106 from within. Path segment $P_2$ terminates at the inner diameter of outer ring 102, where cooling airflow cools outer ring 102 before following path segment $P_3$ between strut 106 and fairing vane 114 to second plenum $PL_2$, cooling strut 106 from the outside. Cooling airflow circulates within Plenum $PL_2$, cooling inner ring 104 of frame 100, before exiting turbine exhaust case 28 via exit 140 along outlet path segment O.

Path segments $P_1$, $P_2$, and $P_3$ connect plena $PL_1$ and $PL_2$ and define a triple-pass serpentine cooling flow path that cools frame 100. Together with fairing 108 and heat shields 124, 126, and 128, this triple-pass cooling flow path allows frame 100 to operate without overheating in the hot environment of turbine exhaust case 28 despite lower heat capability than fairing 108 or heat shields 124, 126, or 128.

DISCUSSION OF POSSIBLE EMBODIMENTS

The following are non-exclusive descriptions of possible embodiments of the present invention.

A turbine exhaust case for a gas turbine engine comprises a frame formed of a frame material, a vane fairing, a heat shield, and a serpentine cooling path. The frame has an outer ring and an inner ring connected by a hollow strut with a radial service line passage. The vane fairing is disposed between the inner ring and the outer ring to define a core airflow path. The heat shield is disposed between the vane fairing and the cast frame. The serpentine cooling flow path passes through and around the outer ring, the inner ring, and the plurality of struts.

The fairing of the preceding paragraph can optionally include, additionally and/or alternatively, any one or more of the following features, configurations, and/or additional components:

wherein the vane fairing and the heat shield are formed of high-temperature capable materials with improved heat capability relative to the frame.

wherein the frame material is steel.

wherein the high-temperature capable materials include nickel-based superalloys.

wherein the nickel-based superalloys include Inconel 625 and/or Inconel 718.

wherein the vane fairing is secured by a retention structure to the inner ring.

wherein the retention structure serves as an air seal between the fairing and the inner ring.

wherein the heat shield comprises an outer heat shield adjacent the outer ring, and a plurality of strut heat shields surrounding the hollow strut.

wherein the heat shield further comprises an inner heat shield adjacent the inner ring, wherein the hollow strut carries a service line air tube in the radial service line passage, and has flow openings extending form the radial service line passage to the exterior of the hollow strut.

wherein the serpentine cooling path is a triple-pass cooling path comprising: a first pass through the service line air tube into a first plenum at the inner diameter of the inner ring; a second pass through the radial service line passage and the flow openings to the inner diameter of the outer ring; and a third pass between the hollow strut and the fairing to a second plenum at the outer diameter of the inner ring.

wherein the triple-pass cooling path terminates in an outlet path through an exit aft of the second plenum.

further comprising: a bearing support disposed concentric with and radially inward of the inner ring to transmit bearing load; and a flow divider extending aft of the inner ring and the bearing support from the inner ring to the bearing support.

wherein the bearing support, the inner ring, and the flow divider together define the first plenum.

wherein the first plenum receives additional pressurized cooling airflow not from the first pass.

wherein the additional pressurized cooling airflow is bled from a compressor of the gas turbine engine.

wherein the first pass draws cooled air from a heat exchanger.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine exhaust case for a gas turbine engine, the turbine exhaust case comprising:
   a frame formed of a frame material, and having an outer ring and an inner ring connected by a hollow strut with a radial service line passage;
   a vane fairing disposed between the inner ring and the outer ring to define a core airflow path;
   a heat shield disposed between the vane fairing and the frame; and
   a serpentine cooling flow path through and around the outer ring, the inner ring, and the plurality of struts;
   wherein the hollow strut carries a service line air tube in the radial service line passage, and has flow openings extending from the radial service line passage to the exterior of the hollow strut;
   wherein the flow openings direct flow from the service line passage towards an inner diameter of the outer ring; and
   wherein the serpentine cooling path is a triple-pass cooling path comprising:
      a first pass through the service line air tube into a first plenum at an inner diameter of the inner ring;
      a second pass through the radial service line passage and the flow openings to an inner diameter of the outer ring; and
      a third pass between the hollow strut and the fairing to a second plenum at the outer diameter of the inner ring.

2. The turbine exhaust case of claim 1, wherein the vane fairing and the heat shield are formed of high-temperature capable materials with improved heat capability relative to the frame material.

3. The turbine exhaust case of claim 2, wherein the frame material is steel.

4. The turbine exhaust case of claim 2, wherein the high-temperature capable materials include nickel-based superalloys.

5. The turbine exhaust case of claim 4, wherein the nickel-based superalloys include Inconel 625 and/or Inconel 718.

6. The turbine exhaust case of claim 1, wherein the vane fairing is secured by a retention structure to the inner ring.

7. The turbine exhaust case of claim 6, wherein the retention structure serves as an air seal between the fairing and the inner ring.

8. The turbine exhaust case of claim 1, wherein the heat shield comprises an outer heat shield adjacent the outer ring, and a plurality of strut heat shields surrounding the hollow strut.

9. The turbine exhaust case of claim 8, wherein the heat shield further comprises an inner heat shield adjacent the inner ring.

10. The turbine exhaust case of claim 1, wherein the triple-pass cooling path terminates in an outlet path through an exit aft of the second plenum.

11. The turbine exhaust case of claim 1, further comprising:
- a bearing support disposed concentric with and radially inward of the inner ring to transmit bearing load; and
- a flow divider extending aft of the inner ring and the bearing support from the inner ring to the bearing support.

12. The turbine exhaust case of claim 11, wherein the bearing support, the inner ring, and the flow divider together define the first plenum.

13. The turbine exhaust case of claim 11, wherein the first plenum receives additional pressurized cooling airflow not from the first pass.

14. The turbine exhaust case of claim 13, wherein the additional pressurized cooling airflow is bled from a compressor of the gas turbine engine.

15. The turbine exhaust case of claim 11, wherein the first pass draws cooled air from a heat exchanger.

* * * * *